(12) United States Patent
Du et al.

(10) Patent No.: US 11,584,387 B2
(45) Date of Patent: Feb. 21, 2023

(54) STEP APPARATUS FOR VEHICLE AND VEHICLE

(71) Applicant: T-MAX (HANGZHOU) TECHNOLOGY CO., LTD., Hangzhou (CN)

(72) Inventors: Xinfa Du, Hangzhou (CN); Qi Zhang, Hangzhou (CN); Yiming Wang, Hangzhou (CN); Xing Fan, Hangzhou (CN); Linjie Xu, Hangzhou (CN)

(73) Assignee: T-MAX (HANGZHOU) TECHNOLOGY CO., LTD., Zhejiang (CN)

( * ) Notice: Subject to any disclaimer, the term of this patent is extended or adjusted under 35 U.S.C. 154(b) by 198 days.

(21) Appl. No.: 16/913,703

(22) Filed: Jun. 26, 2020

(65) Prior Publication Data

US 2021/0078591 A1    Mar. 18, 2021

(30) Foreign Application Priority Data

Sep. 16, 2019 (CN) .......................... 201910871171.4
Sep. 16, 2019 (CN) .......................... 201921536480.8

(51) Int. Cl.
| | | |
|---|---|---|
| *B60W 50/16* | (2020.01) | |
| *B60R 3/02* | (2006.01) | |
| *B60Q 5/00* | (2006.01) | |
| *G01G 19/08* | (2006.01) | |
| *B60W 50/14* | (2020.01) | |

(52) U.S. Cl.
CPC .............. *B60W 50/16* (2013.01); *B60Q 5/00* (2013.01); *B60R 3/02* (2013.01); *G01G 19/08* (2013.01); *B60W 2050/143* (2013.01)

(58) Field of Classification Search
CPC ................................................... B60W 50/16
See application file for complete search history.

(56) References Cited

U.S. PATENT DOCUMENTS

| | | |
|---|---|---|
| 7,591 A | 8/1850 | Burdett |
| 634,385 A | 10/1899 | Wolfe et al. |
| 724,155 A | 3/1903 | Besse |
| 752,031 A | 2/1904 | Chadwick |
| 817,224 A | 4/1906 | Clifford |
| 955,658 A | 4/1910 | Mitchell et al. |
| 1,063,643 A | 6/1913 | Blake et al. |

(Continued)

FOREIGN PATENT DOCUMENTS

| | | |
|---|---|---|
| CA | 1021826 | 11/1977 |
| CA | 2082177 | 5/1994 |

(Continued)

*Primary Examiner* — Michael A Berns
(74) *Attorney, Agent, or Firm* — Perkins Coie LLP

(57) ABSTRACT

Embodiments of the present disclosure provide a step apparatus for a vehicle and a vehicle. In some embodiments, the step apparatus for the vehicle includes: a foot step; a load detection device coupled to the foot step for detecting a load applied to the foot step; a controller in communication with the load detection device and configured to receive and process a load signal detected by the load detection device and to determine whether the foot step is overloaded; and an alarm in communication with the controller. In some embodiments, the controller is further configured to generate an alerting signal to control the alarm to send out an alert when the foot step is overloaded.

19 Claims, 2 Drawing Sheets

(56) References Cited

U.S. PATENT DOCUMENTS

| | | | |
|---|---|---|---|
| 1,169,140 A | 1/1916 | Fassett et al. | |
| 1,176,538 A | 3/1916 | Warner | |
| 1,182,169 A | 5/1916 | Hansen | |
| 1,222,127 A | 4/1917 | Perri | |
| 1,239,892 A | 9/1917 | Dunderdale | |
| 1,242,828 A | 10/1917 | Lyle | |
| 1,250,604 A | 12/1917 | Lorenc | |
| 1,268,335 A | 6/1918 | Fairchild | |
| 1,364,697 A | 1/1921 | Branch | |
| 1,437,648 A | 12/1922 | Gore | |
| 1,449,031 A | 3/1923 | Blake | |
| 1,471,972 A | 10/1923 | Miller | |
| 1,509,235 A * | 9/1924 | Giuliani | B60R 25/04 340/429 |
| 1,621,479 A | 3/1927 | Cleveland et al. | |
| 1,755,942 A | 4/1930 | Woolson | |
| 1,800,162 A | 4/1931 | Stroud | |
| 2,029,745 A | 2/1936 | Stiner | |
| 2,041,640 A | 5/1936 | Goss | |
| 2,118,557 A | 5/1938 | Hamilton | |
| 2,122,040 A | 6/1938 | Machovec | |
| 2,125,085 A | 7/1938 | Pool | |
| 2,197,266 A | 4/1940 | Fredell | |
| 2,209,576 A | 7/1940 | McDonald | |
| 2,246,986 A | 6/1941 | Pellegrini | |
| 2,436,961 A | 3/1948 | Gabriel | |
| 2,487,921 A | 11/1949 | Culver | |
| 2,492,068 A | 12/1949 | Schofield et al. | |
| 2,566,401 A | 9/1951 | Bustin | |
| 2,575,615 A | 11/1951 | Cramp | |
| 2,583,894 A | 1/1952 | Shuck | |
| 2,645,504 A | 7/1953 | Branstrator et al. | |
| 2,669,613 A | 2/1954 | Despard | |
| 2,678,832 A | 5/1954 | Wright | |
| 2,682,671 A | 7/1954 | Faure | |
| 2,764,422 A | 9/1956 | McDonald | |
| 2,774,494 A | 12/1956 | Malmström | |
| 2,825,582 A | 3/1958 | McDonald | |
| 2,921,643 A | 1/1960 | Vanderveld | |
| 2,925,876 A | 2/1960 | Wagner | |
| 2,998,265 A | 8/1961 | Kozicki | |
| 3,008,533 A | 11/1961 | Haberle | |
| 3,012,633 A | 12/1961 | Magee | |
| 3,039,562 A | 6/1962 | Wagner | |
| 3,095,216 A | 6/1963 | Browne et al. | |
| 3,164,394 A | 1/1965 | Husko | |
| 3,172,499 A | 3/1965 | Stairs | |
| 3,266,594 A | 8/1966 | Antosh et al. | |
| 3,329,443 A | 7/1967 | Lowder et al. | |
| 3,392,990 A | 7/1968 | Wolf | |
| 3,488,066 A | 1/1970 | Hansen | |
| 3,494,634 A | 2/1970 | De Paula | |
| 3,515,406 A | 6/1970 | Endsley | |
| 3,517,942 A | 6/1970 | Cuffe et al. | |
| 3,522,396 A | 7/1970 | Norden | |
| 3,528,574 A | 9/1970 | Denner et al. | |
| 3,572,754 A | 3/1971 | Fowler | |
| 3,608,957 A | 9/1971 | Maneck | |
| 3,650,423 A | 3/1972 | O'Brien | |
| 3,671,058 A | 6/1972 | Kent | |
| 3,745,595 A | 7/1973 | Nagy | |
| 3,756,622 A | 9/1973 | Pyle et al. | |
| 3,762,742 A | 10/1973 | Bucklen | |
| 3,784,227 A | 1/1974 | Rogge | |
| 3,799,288 A | 3/1974 | Manuel | |
| 3,807,757 A | 4/1974 | Carpenter et al. | |
| 3,833,240 A | 9/1974 | Weiler | |
| 3,853,369 A | 12/1974 | Holden | |
| 3,863,890 A | 2/1975 | Ruffing | |
| 3,865,399 A | 2/1975 | Way | |
| 3,869,022 A | 3/1975 | Wallk | |
| 3,869,169 A | 3/1975 | Johnson et al. | |
| 3,887,217 A | 6/1975 | Thomas | |
| 3,889,997 A | 6/1975 | Schoneck | |
| 3,891,261 A | 6/1975 | Finneman | |
| 3,913,497 A | 10/1975 | Maroshick | |
| 3,915,475 A | 10/1975 | Casella et al. | |
| 3,957,284 A | 5/1976 | Wright | |
| 3,961,809 A | 6/1976 | Clugston | |
| 3,980,319 A | 9/1976 | Kirkpatrick | |
| 3,981,515 A | 9/1976 | Rosborough | |
| 3,986,724 A | 10/1976 | Rivinius | |
| 3,997,211 A | 12/1976 | Graves | |
| 4,020,920 A | 5/1977 | Abbott | |
| 4,053,172 A | 10/1977 | McClure | |
| 4,058,228 A | 11/1977 | Hall | |
| 4,068,542 A | 1/1978 | Brand et al. | |
| 4,073,502 A | 2/1978 | Frank et al. | |
| 4,089,538 A | 5/1978 | Eastridge | |
| 4,098,346 A | 7/1978 | Stanfill | |
| 4,106,790 A | 8/1978 | Weiler | |
| 4,110,673 A | 8/1978 | Nagy et al. | |
| 4,116,457 A | 9/1978 | Nerem et al. | |
| 4,124,099 A | 11/1978 | Dudynskyj | |
| 4,145,066 A | 3/1979 | Shearin | |
| 4,164,292 A | 8/1979 | Karkau | |
| 4,168,764 A | 9/1979 | Walters | |
| 4,174,021 A | 11/1979 | Barlock | |
| 4,180,143 A | 12/1979 | Clugston | |
| 4,185,849 A | 1/1980 | Jaeger | |
| 4,188,889 A | 2/1980 | Favrel | |
| 4,194,754 A | 3/1980 | Hightower | |
| 4,205,862 A | 6/1980 | Tarvin | |
| 4,219,104 A | 8/1980 | MacLeod | |
| 4,231,583 A | 11/1980 | Learn | |
| 4,275,664 A | 6/1981 | Reddy | |
| 4,325,668 A | 4/1982 | Julian et al. | |
| 4,369,984 A | 1/1983 | Hagen | |
| 4,424,751 A | 1/1984 | Blochlinger | |
| 4,440,364 A | 4/1984 | Cone et al. | |
| 4,462,486 A | 7/1984 | Dignan | |
| 4,536,004 A | 8/1985 | Brynielsson et al. | |
| 4,542,805 A | 9/1985 | Hamlin et al. | |
| 4,570,962 A | 2/1986 | Chavira | |
| 4,623,160 A | 11/1986 | Trudell | |
| D287,001 S | 12/1986 | Jarvie et al. | |
| 4,676,013 A | 6/1987 | Endo | |
| 4,679,810 A | 7/1987 | Kimball | |
| 4,696,349 A | 9/1987 | Harwood et al. | |
| D292,904 S | 11/1987 | Bielby | |
| 4,708,355 A | 11/1987 | Tiede | |
| 4,711,613 A | 12/1987 | Fretwell | |
| 4,720,116 A | 1/1988 | Williams et al. | |
| 4,733,752 A | 3/1988 | Sklar | |
| 4,757,876 A | 7/1988 | Peacock | |
| 4,846,487 A | 7/1989 | Criley | |
| 4,858,888 A | 8/1989 | Cruz et al. | |
| 4,909,700 A | 3/1990 | Fontecchio et al. | |
| 4,911,264 A | 3/1990 | McCafferty | |
| 4,926,965 A | 5/1990 | Fox | |
| 4,930,973 A | 6/1990 | Robinson | |
| 4,958,979 A | 9/1990 | Svensson | |
| 4,982,974 A | 1/1991 | Guidry | |
| 4,991,890 A | 2/1991 | Paulson | |
| D316,394 S | 4/1991 | Carr | |
| 5,005,667 A | 4/1991 | Anderson | |
| 5,005,850 A | 4/1991 | Baughman | |
| 5,007,654 A | 4/1991 | Sauber | |
| 5,028,063 A | 7/1991 | Andrews | |
| 5,039,119 A | 8/1991 | Baughman | |
| 5,085,450 A | 2/1992 | DeHart, Sr. | |
| 5,137,294 A | 8/1992 | Martin | |
| 5,154,125 A | 10/1992 | Renner et al. | |
| 5,195,609 A | 3/1993 | Ham et al. | |
| 5,199,731 A | 4/1993 | Martin | |
| 5,228,707 A | 7/1993 | Yoder | |
| 5,228,761 A | 7/1993 | Huebschen et al. | |
| 5,238,300 A | 8/1993 | Slivon et al. | |
| 5,253,973 A | 10/1993 | Fretwell | |
| D340,905 S | 11/1993 | Orth et al. | |
| 5,257,767 A | 11/1993 | McConnell | |
| 5,257,847 A | 11/1993 | Yonehara | |
| 5,261,779 A | 11/1993 | Goodrich | |
| 5,280,934 A | 1/1994 | Monte | |

(56) References Cited

U.S. PATENT DOCUMENTS

| | | |
|---|---|---|
| 5,284,349 A | 2/1994 | Bruns et al. |
| 5,286,049 A | 2/1994 | Khan |
| 5,342,073 A | 8/1994 | Poole |
| 5,358,268 A | 10/1994 | Hawkins |
| 5,375,864 A | 12/1994 | McDaniel |
| 5,423,463 A | 6/1995 | Weeks |
| 5,425,615 A | 6/1995 | Hall et al. |
| 5,439,342 A | 8/1995 | Hall et al. |
| 5,462,302 A | 10/1995 | Leitner |
| 5,478,124 A | 12/1995 | Warrington |
| 5,498,012 A | 3/1996 | McDaniel et al. |
| 5,501,475 A | 3/1996 | Bundy |
| 5,505,476 A | 4/1996 | Maccabee |
| 5,513,866 A | 5/1996 | Sisson |
| 5,538,100 A | 7/1996 | Hedley |
| 5,538,265 A | 7/1996 | Chen et al. |
| 5,538,269 A | 7/1996 | McDaniel et al. |
| 5,547,040 A | 8/1996 | Hanser et al. |
| 5,549,312 A | 8/1996 | Garvert |
| 5,584,493 A | 12/1996 | Demski et al. |
| 5,601,300 A | 2/1997 | Fink et al. |
| 5,624,127 A | 4/1997 | Arreola et al. |
| 5,697,623 A | 12/1997 | Bermes et al. |
| 5,697,626 A | 12/1997 | McDaniel |
| 5,727,840 A | 3/1998 | Ochiai et al. |
| 5,779,208 A | 7/1998 | McGraw |
| 5,842,709 A | 12/1998 | Maccabee |
| 5,876,051 A | 3/1999 | Sage |
| 5,897,125 A | 4/1999 | Bundy |
| 5,937,468 A | 8/1999 | Wiedeck et al. |
| 5,941,342 A | 8/1999 | Lee |
| 5,957,237 A | 9/1999 | Tigner |
| 5,980,449 A | 11/1999 | Benson et al. |
| 5,988,970 A | 11/1999 | Holtom |
| 6,012,545 A | 1/2000 | Faleide |
| 6,027,090 A | 2/2000 | Liu |
| 6,042,052 A | 3/2000 | Smith et al. |
| 6,055,780 A | 5/2000 | Yamazaki |
| 6,065,924 A | 5/2000 | Budd |
| 6,082,693 A | 7/2000 | Benson et al. |
| 6,082,751 A | 7/2000 | Hanes et al. |
| 6,112,152 A | 8/2000 | Tuttle |
| 6,135,472 A | 10/2000 | Wilson et al. |
| 6,149,172 A | 11/2000 | Pascoe et al. |
| 6,158,756 A | 12/2000 | Hansen |
| 6,168,176 B1 | 1/2001 | Mueller |
| 6,170,842 B1 | 1/2001 | Mueller |
| 6,179,312 B1 | 1/2001 | Paschke et al. |
| 6,179,546 B1 | 1/2001 | Citrowske |
| 6,203,040 B1 | 3/2001 | Hutchins |
| 6,213,486 B1 | 4/2001 | Kunz et al. |
| 6,224,317 B1 | 5/2001 | Kann |
| 6,264,222 B1 | 7/2001 | Johnston et al. |
| 6,270,099 B1 | 8/2001 | Farkash |
| 6,325,397 B1 | 12/2001 | Pascoe |
| 6,352,295 B1 | 3/2002 | Leitner |
| 6,357,992 B1 | 3/2002 | Ringdahl et al. |
| 6,375,207 B1 | 4/2002 | Dean et al. |
| 6,412,799 B1 | 7/2002 | Schrempf |
| 6,422,342 B1 | 7/2002 | Armstrong et al. |
| 6,425,572 B1 | 7/2002 | Lehr |
| 6,430,164 B1 | 8/2002 | Jones et al. |
| 6,435,534 B1 | 8/2002 | Stone |
| 6,439,342 B1 | 8/2002 | Boykin |
| 6,460,915 B1 | 10/2002 | Bedi et al. |
| 6,471,002 B1 | 10/2002 | Weinerman |
| 6,511,086 B2 | 1/2003 | Schlicht |
| 6,511,402 B2 | 1/2003 | Shu |
| 6,513,821 B1 | 2/2003 | Heil |
| 6,533,303 B1 | 3/2003 | Watson |
| 6,536,790 B1 | 3/2003 | Ojanen |
| 6,588,783 B2 | 7/2003 | Fichter |
| 6,612,596 B2 | 9/2003 | Jeon et al. |
| 6,641,158 B2 | 11/2003 | Leitner |
| 6,659,484 B2 | 12/2003 | Knodle et al. |
| 6,663,125 B1 | 12/2003 | Cheng |
| 6,746,033 B1 | 6/2004 | McDaniel |
| 6,769,704 B2 | 8/2004 | Cipolla |
| 6,810,995 B2 | 11/2004 | Warford |
| 6,812,466 B2 | 11/2004 | O'Connor et al. |
| 6,830,257 B2 | 12/2004 | Leitner |
| 6,834,875 B2 | 12/2004 | Leitner |
| 6,840,526 B2 | 1/2005 | Anderson et al. |
| 6,874,801 B2 | 4/2005 | Fichter |
| 6,880,843 B1 | 4/2005 | Greer, Jr. |
| 6,912,912 B2 | 7/2005 | Reichinger et al. |
| 6,918,624 B2 | 7/2005 | Miller et al. |
| 6,926,295 B2 | 8/2005 | Berkebile et al. |
| 6,938,909 B2 | 9/2005 | Leitner |
| 6,942,233 B2 | 9/2005 | Leitner et al. |
| 6,942,272 B2 | 9/2005 | Livingston |
| 6,948,903 B2 | 9/2005 | Ablabutyan et al. |
| 6,951,357 B2 | 10/2005 | Armstrong et al. |
| 6,955,370 B2 | 10/2005 | Fabiano et al. |
| 6,959,937 B2 | 11/2005 | Schneider et al. |
| 6,966,597 B2 | 11/2005 | Tegtmeier |
| 6,971,652 B2 | 12/2005 | Bobbert et al. |
| 6,997,469 B2 | 2/2006 | Lanoue et al. |
| 7,000,932 B2 | 2/2006 | Heil et al. |
| 7,007,961 B2 | 3/2006 | Leitner |
| 7,017,927 B2 | 3/2006 | Henderson et al. |
| 7,055,839 B2 | 6/2006 | Leitner |
| 7,090,276 B1 | 8/2006 | Bruford et al. |
| 7,111,859 B2 | 9/2006 | Kim et al. |
| 7,118,120 B2 | 10/2006 | Lee et al. |
| 7,163,221 B2 | 1/2007 | Leitner |
| 7,258,386 B2 | 8/2007 | Leitner |
| 7,287,771 B2 | 10/2007 | Lee et al. |
| 7,360,779 B2 | 4/2008 | Crandall |
| 7,367,574 B2 | 5/2008 | Leitner |
| 7,380,807 B2 | 6/2008 | Leitner |
| 7,398,985 B2 | 7/2008 | Leitner et al. |
| 7,413,204 B2 | 8/2008 | Leitner |
| 7,416,202 B2 | 8/2008 | Fichter |
| 7,487,986 B2 | 2/2009 | Leither et al. |
| 7,516,703 B2 | 4/2009 | Tazreiter |
| 7,566,064 B2 | 7/2009 | Leitner et al. |
| 7,584,975 B2 | 9/2009 | Leitner |
| 7,594,672 B2 | 9/2009 | Piotrowski |
| 7,621,546 B2 | 11/2009 | Ross et al. |
| 7,637,519 B2 | 12/2009 | Leitner et al. |
| 7,673,892 B2 | 3/2010 | Kuntze et al. |
| 7,717,444 B2 | 5/2010 | Fichter |
| 7,740,261 B2 | 6/2010 | Leitner et al. |
| 7,793,596 B2 | 9/2010 | Hirtenlehner |
| 7,823,896 B2 | 11/2010 | VanBelle |
| 7,874,565 B2 | 1/2011 | Duncan |
| D634,687 S | 3/2011 | Vukel |
| 7,900,944 B2 | 3/2011 | Watson |
| 7,909,344 B1 | 3/2011 | Bundy |
| 7,934,737 B2 | 5/2011 | Okada |
| 7,976,042 B2 | 7/2011 | Watson et al. |
| 8,038,164 B2 | 10/2011 | Stahl et al. |
| 8,042,821 B2 | 10/2011 | Yang et al. |
| D649,100 S | 11/2011 | Cheng |
| 8,052,162 B2 | 11/2011 | Yang et al. |
| 8,056,913 B2 | 11/2011 | Kuntze et al. |
| 8,070,173 B2 | 12/2011 | Watson |
| 8,136,826 B2 | 3/2012 | Watson |
| 8,146,935 B1 | 4/2012 | Adams |
| 8,157,277 B2 | 4/2012 | Leitner et al. |
| 8,177,247 B1 | 5/2012 | Carr |
| 8,205,901 B2 | 6/2012 | Yang et al. |
| D665,713 S | 8/2012 | Pochurek et al. |
| 8,262,113 B1 | 9/2012 | Chafey et al. |
| 8,297,635 B2 | 10/2012 | Agoncillo et al. |
| D671,874 S | 12/2012 | Kekich et al. |
| 8,342,550 B2 | 1/2013 | Stickles et al. |
| 8,342,551 B2 | 1/2013 | Watson et al. |
| 8,360,455 B2 | 1/2013 | Leitner et al. |
| 8,408,571 B2 | 4/2013 | Leitner et al. |
| 8,419,034 B2 | 4/2013 | Leitner et al. |
| 8,469,380 B2 | 6/2013 | Yang et al. |
| 8,602,431 B1 | 12/2013 | May |

(56) References Cited

U.S. PATENT DOCUMENTS

| | | |
|---|---|---|
| 8,827,294 B1 | 9/2014 | Leitner et al. |
| 8,833,782 B2 | 9/2014 | Huotari et al. |
| 8,844,957 B2 | 9/2014 | Leitner et al. |
| D720,674 S | 1/2015 | Stanesic et al. |
| 8,936,266 B2 | 1/2015 | Leitner et al. |
| 8,944,451 B2 | 2/2015 | Leitner et al. |
| 9,156,406 B2 | 10/2015 | Stanesic et al. |
| 9,272,667 B2 | 3/2016 | Smith |
| 9,302,626 B2 | 4/2016 | Leitner et al. |
| 9,346,404 B1 | 5/2016 | Bundy |
| 9,346,405 B2 | 5/2016 | Leitner et al. |
| 9,511,717 B2 | 12/2016 | Smith |
| 9,522,634 B1 | 12/2016 | Smith |
| 9,527,449 B2 | 12/2016 | Smith |
| 9,550,458 B2 | 1/2017 | Smith et al. |
| 9,561,751 B2 | 2/2017 | Leitner et al. |
| 9,573,467 B2 | 2/2017 | Chen et al. |
| 9,656,609 B2 | 5/2017 | Du et al. |
| 9,669,766 B2 | 6/2017 | Du et al. |
| 9,669,767 B2 | 6/2017 | Du et al. |
| 9,688,205 B2 | 6/2017 | Du et al. |
| 9,701,249 B2 | 7/2017 | Leitner et al. |
| 9,764,691 B2 | 9/2017 | Stickles et al. |
| 9,809,172 B2 | 11/2017 | Stanesic et al. |
| 9,834,147 B2 | 12/2017 | Smith |
| 9,902,328 B1 | 2/2018 | Mazur |
| 9,944,231 B2 | 4/2018 | Leitner et al. |
| 9,975,742 B1 | 5/2018 | Mason |
| 10,010,467 B2 * | 7/2018 | Sato .............. G01G 21/161 |
| 10,049,505 B1 | 8/2018 | Harvey |
| 10,053,017 B2 | 8/2018 | Leitner et al. |
| 10,065,486 B2 | 9/2018 | Smith et al. |
| 10,077,016 B2 | 9/2018 | Smith et al. |
| 10,081,302 B1 | 9/2018 | Frederick et al. |
| 10,106,069 B2 | 10/2018 | Rasekhi |
| 10,106,086 B1 | 10/2018 | Eckstein et al. |
| 10,106,087 B2 | 10/2018 | Stojkovic et al. |
| 10,106,088 B2 | 10/2018 | Smith |
| 10,118,557 B2 | 11/2018 | Pribisic |
| 10,124,735 B2 | 11/2018 | Du et al. |
| 10,124,839 B2 | 11/2018 | Povinelli et al. |
| 10,140,618 B2 * | 11/2018 | Crawford .......... G01G 23/3735 |
| 10,144,345 B2 | 12/2018 | Stinson et al. |
| 10,150,419 B2 | 12/2018 | Derbis et al. |
| 10,155,474 B2 | 12/2018 | Salter et al. |
| 10,173,595 B1 | 1/2019 | Ulrich |
| 10,183,623 B2 | 1/2019 | Krishnan et al. |
| 10,183,624 B2 | 1/2019 | Leitner et al. |
| 10,189,517 B2 | 1/2019 | Povinelli et al. |
| 10,195,997 B2 | 2/2019 | Smith |
| 10,207,598 B2 | 2/2019 | Reynolds et al. |
| 10,214,963 B2 | 2/2019 | Simula et al. |
| 10,384,614 B1 | 8/2019 | Du et al. |
| 10,427,607 B2 * | 10/2019 | Otacioglu .............. B60R 3/002 |
| 10,539,285 B1 | 1/2020 | Johnson |
| 10,576,879 B1 | 3/2020 | Salter |
| 10,618,472 B2 | 4/2020 | Du |
| 10,649,483 B2 | 5/2020 | Liu et al. |
| 10,682,960 B2 | 6/2020 | Du |
| 10,821,904 B2 | 11/2020 | Du |
| 10,885,759 B1 * | 1/2021 | Lee ................ G08B 21/0453 |
| 11,021,108 B2 | 6/2021 | Du |
| 11,198,394 B2 | 12/2021 | Du et al. |
| 11,208,043 B2 | 12/2021 | Du et al. |
| 11,292,390 B2 | 4/2022 | Du et al. |
| 11,318,889 B2 | 5/2022 | Du et al. |
| 11,414,017 B2 | 8/2022 | Qing et al. |
| 2002/0109446 A1 | 8/2002 | Arnold |
| 2002/0130531 A1 | 9/2002 | Leitner |
| 2002/0153201 A1 | 10/2002 | Warford |
| 2003/0011164 A1 | 1/2003 | Cipolla |
| 2003/0038446 A1 | 2/2003 | Anderson et al. |
| 2003/0090081 A1 | 5/2003 | Oakley |
| 2003/0094781 A1 | 5/2003 | Jaramillo et al. |
| 2003/0132595 A1 | 7/2003 | Fabiano et al. |
| 2003/0200700 A1 | 10/2003 | Leitner |
| 2004/0100063 A1 | 5/2004 | Henderson et al. |
| 2004/0108678 A1 | 6/2004 | Berkebile et al. |
| 2004/0135339 A1 | 7/2004 | Kim |
| 2005/0035568 A1 | 2/2005 | Lee et al. |
| 2005/0146157 A1 | 7/2005 | Leitner |
| 2005/0231149 A1 | 10/2005 | Numauchi |
| 2005/0280242 A1 | 12/2005 | Fabiano et al. |
| 2006/0082096 A1 | 4/2006 | Sukonthapanich et al. |
| 2006/0214386 A1 | 9/2006 | Watson |
| 2006/0219484 A1 | 10/2006 | Ogura |
| 2006/0284440 A1 | 12/2006 | Leitner |
| 2008/0042396 A1 | 2/2008 | Watson |
| 2008/0100023 A1 | 5/2008 | Ross |
| 2008/0100025 A1 | 5/2008 | Leitner et al. |
| 2008/0116653 A1 | 5/2008 | Piotrowski |
| 2008/0271936 A1 | 11/2008 | Kuntze et al. |
| 2009/0250896 A1 | 10/2009 | Watson |
| 2009/0295114 A1 | 12/2009 | Yang et al. |
| 2009/0295115 A1 | 12/2009 | Yang et al. |
| 2010/0044993 A1 | 2/2010 | Watson |
| 2011/0115187 A1 | 5/2011 | Leitner et al. |
| 2011/0246021 A1 | 10/2011 | Prokhorov |
| 2012/0025485 A1 | 2/2012 | Yang et al. |
| 2012/0046846 A1 | 2/2012 | Dollens |
| 2013/0154230 A1 | 6/2013 | Ziaylek |
| 2015/0094898 A1 | 4/2015 | Tellis |
| 2015/0097353 A1 | 4/2015 | Rasmussen et al. |
| 2015/0137482 A1 * | 5/2015 | Woolf ................ B60D 1/62 |
| | | 280/448 |
| 2015/0197199 A1 | 7/2015 | Kuo |
| 2015/0321612 A1 | 11/2015 | Leitner et al. |
| 2015/0321613 A1 | 11/2015 | Leitner et al. |
| 2016/0039346 A1 | 2/2016 | Yang et al. |
| 2016/0193964 A1 | 7/2016 | Stanesic et al. |
| 2016/0280190 A1 | 9/2016 | Franz |
| 2017/0008459 A1 | 1/2017 | Leitner et al. |
| 2017/0021781 A1 | 1/2017 | Du |
| 2017/0036605 A1 | 2/2017 | Du |
| 2017/0036606 A1 | 2/2017 | Du |
| 2017/0036607 A1 | 2/2017 | Du et al. |
| 2017/0144606 A1 | 5/2017 | Smith |
| 2017/0190308 A1 | 6/2017 | Smith |
| 2017/0246993 A1 | 8/2017 | Smith |
| 2017/0267182 A1 | 9/2017 | Leitner |
| 2017/0355315 A1 | 12/2017 | Leitner |
| 2018/0095457 A1 | 4/2018 | Lee |
| 2018/0141497 A1 | 5/2018 | Smith |
| 2018/0201194 A1 | 7/2018 | Stanesic |
| 2018/0257572 A1 | 9/2018 | Du et al. |
| 2018/0281687 A1 | 10/2018 | Derbis et al. |
| 2018/0293811 A1 | 10/2018 | Liu |
| 2018/0326911 A1 | 11/2018 | Leitner |
| 2019/0009725 A1 | 1/2019 | Stojkovic et al. |
| 2019/0047477 A1 | 2/2019 | Crandall |
| 2019/0054961 A1 | 2/2019 | Ngo |
| 2019/0071021 A1 | 3/2019 | Pribisic |
| 2019/0071042 A1 | 3/2019 | Smith |
| 2019/0084482 A1 | 3/2019 | Long et al. |
| 2019/0084628 A1 | 3/2019 | Povinelli et al. |
| 2020/0023779 A1 | 1/2020 | Du et al. |
| 2020/0023780 A1 | 1/2020 | Du et al. |
| 2020/0047674 A1 | 2/2020 | Du et al. |
| 2020/0262354 A1 | 8/2020 | Du et al. |
| 2020/0265658 A1 | 8/2020 | Du et al. |
| 2020/0269763 A1 | 8/2020 | Du et al. |
| 2020/0282814 A1 | 9/2020 | Alban et al. |
| 2020/0282913 A1 | 9/2020 | Qing |
| 2020/0290424 A1 | 9/2020 | Zhan |
| 2020/0282914 A1 | 10/2020 | Du et al. |
| 2020/0331396 A1 | 10/2020 | Du et al. |
| 2021/0078591 A1 * | 3/2021 | Du .................... B60R 3/02 |
| 2021/0213885 A1 | 7/2021 | Du et al. |
| 2021/0347303 A1 | 11/2021 | Qing et al. |
| 2021/0347304 A1 | 11/2021 | Qing et al. |
| 2022/0194299 A1 | 6/2022 | Du et al. |
| 2022/0219612 A1 | 7/2022 | Du et al. |

(56) References Cited

U.S. PATENT DOCUMENTS

FOREIGN PATENT DOCUMENTS

| | | |
|---|---|---|
| CA | 2218280 A1 | 6/1999 |
| CA | 2332193 A1 | 9/2001 |
| CA | 2370618 A1 | 11/2007 |
| CN | 2174368 Y | 8/1994 |
| CN | 2806241 Y | 8/2006 |
| CN | 1976833 A | 6/2007 |
| CN | 101279594 A | 10/2008 |
| CN | 102394918 A | 3/2012 |
| CN | 202806579 U | 3/2013 |
| CN | 103507719 A | 1/2014 |
| CN | 203728468 U | 7/2014 |
| CN | 104192070 A | 12/2014 |
| CN | 204474223 U | 7/2015 |
| CN | 105083136 A | 11/2015 |
| CN | 105083137 A | 11/2015 |
| CN | 105128751 A | 12/2015 |
| CN | 105450762 A | 3/2016 |
| CN | 106249641 A | 12/2016 |
| CN | 106499293 A | 3/2017 |
| CN | 107601333 A | 1/2018 |
| CN | 108263303 A | 7/2018 |
| CN | 108454518 A | 8/2018 |
| CN | 207758678 U | 8/2018 |
| CN | 108583446 A | 9/2018 |
| CN | 108632335 A | 10/2018 |
| CN | 108791086 A | 11/2018 |
| CN | 108973868 A | 12/2018 |
| CN | 208232903 U | 12/2018 |
| CN | 109253888 A | 1/2019 |
| CN | 208325054 U | 1/2019 |
| CN | 208344082 U | 1/2019 |
| DE | 1042403 B | 10/1958 |
| DE | 1220276 B | 6/1966 |
| DE | 2555468 A1 | 6/1977 |
| DE | 7922488 U1 | 7/1982 |
| DE | 3151621 A1 | 7/1983 |
| DE | 3932142 | 4/1990 |
| DE | 8910933 U1 | 10/1990 |
| EP | 00664493 | 12/1982 |
| EP | 373842 A1 | 6/1990 |
| EP | 0418615 A1 | 3/1991 |
| EP | 0559624 B1 | 8/1995 |
| EP | 0901783 A2 | 3/1999 |
| EP | 0966367 A1 | 12/1999 |
| EP | 1116840 A2 | 7/2001 |
| EP | 1213185 B1 | 12/2004 |
| EP | 3002157 | 4/2016 |
| EP | 3176038 B1 | 1/2019 |
| EP | 3237254 B1 | 2/2019 |
| FR | 1271901 A | 9/1961 |
| FR | 1350593 A | 1/1964 |
| FR | 2225612 A | 8/1974 |
| FR | 2651739 A1 | 3/1991 |
| FR | 2764254 A1 | 12/1998 |
| GB | 191315077 | 8/1913 |
| GB | 254426 | 7/1926 |
| GB | 340162 A | 12/1930 |
| GB | 381672 | 10/1932 |
| GB | 745918 | 3/1956 |
| GB | 934387 | 9/1963 |
| GB | 936846 | 9/1963 |
| GB | 987846 A | 3/1965 |
| GB | 1430813 A | 4/1976 |
| GB | 1471256 A | 4/1977 |
| GB | 2045699 A | 11/1980 |
| GB | 2055705 A | 3/1981 |
| GB | 2129378 | 5/1984 |
| GB | 2201511 A | 9/1988 |
| GB | 2288014 A | 10/1995 |
| IN | 201741011829 | 10/2018 |
| JP | 63-255144 A | 10/1988 |
| JP | H04139044 A | 5/1992 |
| JP | H04339040 A | 11/1992 |
| JP | H04342629 A | 11/1992 |
| JP | H05310061 A | 11/1993 |
| JP | H05310081 A | 11/1993 |
| JP | 8-132967 A | 5/1996 |
| JP | H08132967 A | 5/1996 |
| JP | H10287182 A | 10/1998 |
| JP | 2018-177089 A | 11/2018 |
| JP | 2019-001222 A | 1/2019 |
| KR | 2000-0003099 | 1/2000 |
| KR | 101719102 B1 | 3/2017 |
| MX | 2017001699 A | 8/2018 |
| MX | 2017001700 A | 8/2018 |
| MX | 2017006328 A | 8/2018 |
| MX | 2017008032 A | 9/2018 |
| MX | 2017010183 A | 9/2018 |
| SU | 403594 | 11/1973 |
| SU | 783097 A1 | 11/1980 |
| WO | 1988/05759 A1 | 8/1988 |
| WO | 1995/00359 A1 | 1/1995 |
| WO | 1997/027139 A1 | 7/1997 |
| WO | 1998/43856 A2 | 10/1998 |
| WO | 2000/047449 A1 | 8/2000 |
| WO | 2001/000441 A1 | 1/2001 |
| WO | 2003/039910 A1 | 5/2003 |
| WO | 2003/039920 A1 | 5/2003 |
| WO | 2003/066380 A1 | 8/2003 |
| WO | 2003/069294 A1 | 8/2003 |
| WO | 2006/050297 A2 | 5/2006 |
| WO | 2009/103163 A1 | 8/2009 |
| WO | 2017/176226 A1 | 10/2017 |
| WO | 2018/148643 A1 | 8/2018 |
| WO | 2018/197393 A1 | 11/2018 |
| WO | 2019/009131 A1 | 1/2019 |
| WO | 2019/034493 A1 | 2/2019 |

\* cited by examiner

STEP APPARATUS FOR VEHICLE AND VEHICLE

CROSS-REFERENCE TO RELATED APPLICATIONS

This application claims priority to and benefits of Chinese Patent Application Nos. 201921536480.8 and 201910871171.4, each filed with National Intellectual Property Administration of the People's Republic of China (PRC) on Sep. 16, 2019. The entire content of the aforementioned patent applications is incorporated by reference as part of this patent document for all purposes.

TECHNICAL FIELD

This patent document relates to a field of vehicles, and particularly to a step apparatus for a vehicle and a vehicle having the step apparatus.

BACKGROUND

A foot step for a vehicle is usually arranged on a chassis below a vehicle door (such as a side door and/or a tail door) for people to get on and off the vehicle. In the related art, the foot step for the vehicle includes a fixed step and an electrically retractable step. The electrically retractable step is driven by a retractable device and is movable between an extended position and a retracted position, and the retractable device is connected with the chassis of the vehicle.

However, in the related art, the foot step for the vehicle may be overloaded in use, such that the foot step may be damaged and even caused to be fractured. Thus, a service life of the foot step is reduced, and a user tends to be harmed.

SUMMARY

In some aspects, the present disclosure provides a step apparatus for a vehicle, which can detect a load applied to a foot step.

In some aspects, the present disclosure provides a vehicle having the above step apparatus for the vehicle.

According to an example embodiment of a first aspect of the present disclosure, a step apparatus for a vehicle includes: a foot step; a load detection device arranged to the foot step for detecting a load applied to the foot step; a controller connected with the load detection device, and configured to receive and process a load signal detected by the load detection device and to judge whether the foot step is overloaded; an alarm connected with the controller. The controller is configured to generate an alerting signal to control the alarm to send out an alert when the foot step is overloaded.

According to an example embodiment of a second aspect of the present disclosure, a step apparatus for a vehicle includes: a foot step; a load detection device arranged to the foot step for detecting a load applied to the foot step; a cloud server configured to receive and process the load signal detected by the load detection device to periodically generate a load change report of the foot step and an overloaded usage report of the foot step.

According to an example embodiment of a third aspect of the present disclosure, a vehicle includes: a vehicle body; and a step apparatus. The step apparatus includes: a foot step; a load detection device arranged to the foot step for detecting a load applied to the foot step; a controller connected with the load detection device, and configured to receive and process a load signal detected by the load detection device and to judge whether the foot step is overloaded; an alarm connected with the controller. The controller is configured to generate an alerting signal to control the alarm to send out an alert when the foot step is overloaded.

The subject matter described in this patent document can be implemented in specific ways that provide one or more of the following features.

DETAILED DESCRIPTION

Figure 1:
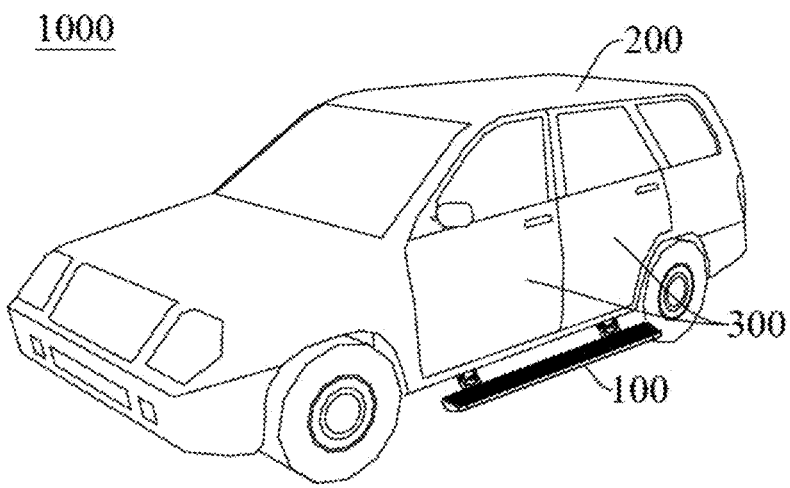
FIG. 1 is a schematic view of a vehicle according to an embodiment of the present disclosure.

Embodiments of the present disclosure are described in detail below, and some examples of the embodiments are illustrated in the drawings. The embodiments described below with reference to the accompanying drawings are exemplary, are merely used to explain the present disclosure, and cannot be construed as a limitation to the present disclosure. In the present disclosure, it is to be understood that the orientations or the position relationships indicated by terms such as "central," "longitudinal," "lateral," "length," "width," "thickness," "up," "down," "front," "rear," "left," "right," "vertical," "horizontal," "top," "bottom," "inner," "outer," "clockwise," "counterclockwise", "axial" "radial" and "circumferential" indicate are the orientations or the position relationships illustrated in the drawings, only intended for convenient descriptions of the present disclosure and also for simplifying descriptions of the relative position relationships among elements, and do not indicate or imply that the device or element referred to must have a particular orientation or be constructed and operated in a specific orientation, and hence cannot be construed as a limitation to the present disclosure, unless specified otherwise.

A step apparatus for a vehicle and a vehicle according to embodiments of the present disclosure are described as follows with reference to drawings.

As illustrated in FIGS. 1-4, the vehicle 1000 according to embodiments of the present disclosure includes a vehicle body 200 and a step apparatus. The step apparatus for a vehicle is a step apparatus 100 according to the embodiments of the present disclosure.

As illustrated in FIG. 1, the step apparatus 100 for the vehicle 1000 is mounted to a bottom surface of the vehicle body 200. In some implementations, the step apparatus 100 for the vehicle 1000 is mounted to a chassis of the vehicle body 200.

The vehicle 1000 includes vehicle doors 300, and the step apparatus 100 for the vehicle 1000 is arranged adjacent to one or more of the vehicle doors 300 and located beneath the vehicle door 300. In an example illustrated in FIG. 1, the vehicle 1000 has four doors, where the vehicle door 300 includes one or more side doors. In this example, each side of the vehicle body 200 is provided with two vehicle doors 300, and both sides of the vehicle body 200 are provided with one step apparatus 100 for the vehicle. The present disclosure is not limited to this. For example, the vehicle 1000 may have two vehicle doors 300, where each side of the vehicle body 200 is provided with one vehicle door 300, and both sides of the vehicle body 200 are provided with one step apparatus 100, adjacent to the vehicle door 300 on each side. In some embodiments, the vehicle 1000 may also have a tail door (not illustrated), and a tail part of the vehicle body 200 is provided with the step apparatus 100 for the vehicle adjacent to the tail door.

The step apparatus for the vehicle according to the embodiments of the present disclosure will be described as follows.

As illustrated in FIGS. 1-5, the step apparatus 100 for a vehicle according to the embodiment of the present disclosure includes a foot step 10, a load detection device 20, a controller 30 and an alarm 40. The load detection device 20 is coupled to the foot step 10 and configured to detect a load applied to the foot step 10. In other words, a change of the load applied to the foot step 10 may be detected by the load detection device 20.

The controller 30 is in communication with the load detection device 20 and configured to receive and process a load signal detected by the load detection device 20. In processing the load signal, the controller 30 determines whether the foot step 10 is overloaded. For example, a value of a maximum load applied to the foot step 10 is preset with the controller 30. When a load detected by the load detection device 20 is greater than the value of the maximum load, the foot step 10 is overloaded, and a judgment result of the controller 30 is yes, i.e., indicative of the foot step 10 being overloaded. When the load detected by the load detection device 20 is less than or equal to the value of the maximum load, the foot step 10 is not overloaded, and the judgment result of the controller 30 is no, i.e., indicative of the foot step 10 not being overloaded.

The alarm 40 is in communication with the controller 30. In implementations, when the foot step 10 is overloaded, the controller 30 generates an alerting signal so as to control the alarm 40 to send out an alert. For example, when the judgment result of controller 30 is yes, the controller 30 sends the alerting signal to the alarm 40. The alarm 40 receives the alerting signal and sends out the alert, so as to alert or remind a user when the foot step 10 is overloaded.

Figure 5:
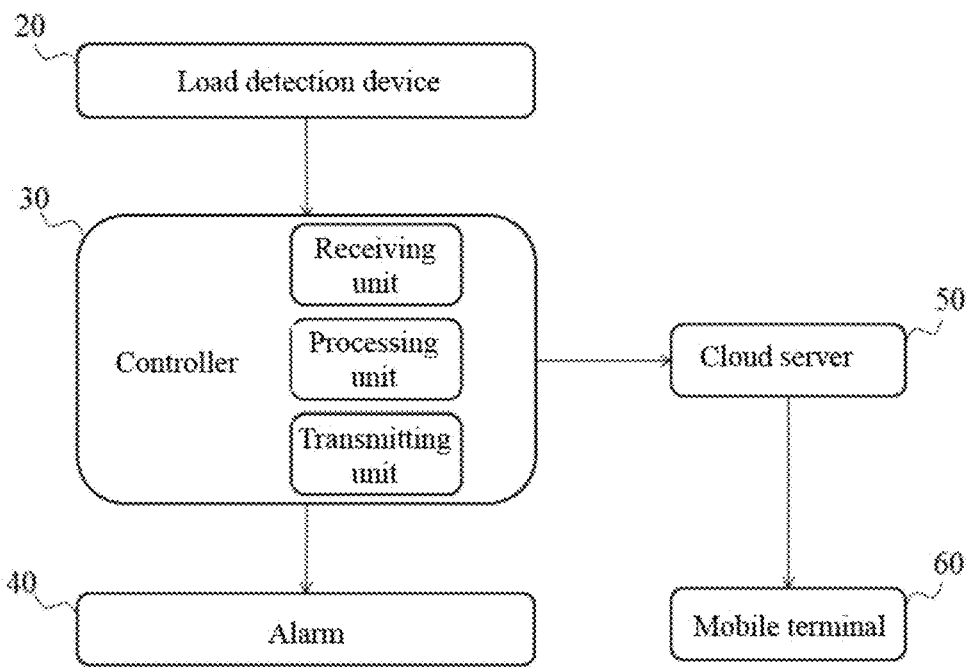
FIG. 5 is a partially schematic view of a step apparatus for a vehicle according to an embodiment of the present disclosure.
Figure 6:
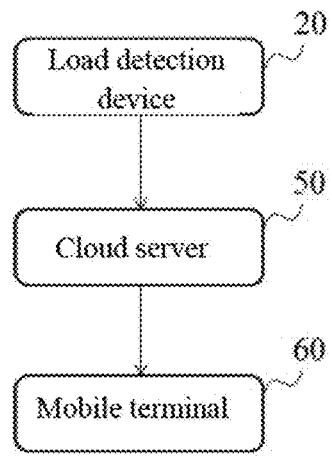
FIG. 6 is a partially schematic view of a step apparatus for a vehicle according to another embodiment of the present disclosure.

In some embodiments, as illustrated in FIG. 5, the controller 30 includes a receiving unit, a processing unit and a transmitting unit. The receiving unit is configured to receive the load signal detected by the load detection device 20. The processing unit is configured to process the load signal detected by the load detection device 20 and received by the receiving unit, and to determine (e.g., judge) whether the foot step 10 is overloaded. The transmitting unit is configured to emit the alerting signal to the controller 30 according to the judgment result of the processing unit.

In some embodiments, the controller 30 may be an electronic control unit (ECU) integrated into the vehicle 1000. In some embodiments, the controller 30 can be coupled to or integrated with the load detection device 20. In some embodiments, the controller 30 can be resident on an external device, i.e., external to the vehicle 1000.

In the step apparatus 100, according to some example embodiments of the present disclosure, the load applied to the foot step 10 is detected by the load detection device 20 coupled to the foot step 10, and the load signal is received and processed by the controller 30, which determines whether the foot step 10 is overloaded. When the foot step 10 is overloaded, the alert is sent out by the alarm 40 to remind the user. Thus, the step apparatus 100 can detect the change of the load applied to the foot step 10 and have a function of overload alerting, e.g., to alert or remind a user to avoid damage or potential fracture of the foot step 10, and further, so as not to harm the user.

In some embodiments, the step apparatus 100 may further include a wireless transmission device (not illustrated), where the wireless transmission device is used for wireless transmission of the load signal between the load detection device 20 and the controller 30 and/or for wireless transmission of the alerting signal between the controller 30 and the alarm 40. In other words, the wireless transmission device may wirelessly transmit the load signal of the load detection device 20 to the controller 30, and/or the wireless transmission device may transmit the alerting signal sent by the controller 30 to the alarm 40.

Furthermore, the wireless transmission device may include a first wireless transmitting unit arranged with respect to the foot step 10 for sending the load signal to the controller 30, a second wireless transmitting unit arranged with respect to the foot step 10 for sending the alerting signal from the controller 30 to the alarm 40, and a wireless receiving unit arranged with respect to the foot step 10 and connected to the controller 30. It should be understood that the wireless transmission device may be configured for a bidirectional wireless transmission between the controller 30 and the load detection device 20, and a bidirectional wireless transmission between the controller 30 and the alarm 40.

In some embodiments, the step apparatus 100 may further include a cloud server 50, where the cloud server 50 is used for receiving and storing the load signal and/or the alerting signal.

As illustrated in FIG. 5, the cloud server 50 is connected to the controller 30, and the cloud server 50 may receive and store the load signal and/or the alerting signal transmitted by the controller 30. In some implementations, the cloud server 50 may record load information applied to the foot step 10 and/or alert information sent by the alarm 40 when the foot step 10 is overloaded. Furthermore, in some implementations, the cloud server 50 may periodically provide a change report of the load applied to the foot step 10 and a usage alert report for the user.

In some embodiments, the step apparatus 100 further includes a mobile terminal 60, which is connected to the cloud server 50 for receiving the load signal and/or the alerting signal from the cloud server 50.

In other words, the cloud server 50 may send the recorded load information applied to the foot step 10 and/or the recorded alert information sent by the alarm 40 when the foot step 10 is overloaded to the mobile terminal 60. With the mobile terminal 60, the user may intuitively check the load information applied to the foot step 10 and/or the alert information sent by the alarm 40 when the foot step 10 is overloaded. It can be understood that, the cloud server 50 periodically provides the change report of the load applied to the foot step 10 and the usage alert report. The user can intuitively check the change report of the load applied to the foot step 10 and the usage alert report through the mobile terminal 60.

In some embodiments, the mobile terminal 60 is a mobile device, such as a smartphone. The user can intuitively check the information such as the load applied to the foot step 10, whether the foot step 10 is overloaded, the load change report and the usage alert report through the mobile smartphone.

Furthermore, the mobile terminal 60 may also be used as the alarm 40. In other words, the alarm 40 is configured as the mobile terminal 60, and the mobile terminal 60 may receive the alerting signal of the controller 30 and send an alert when the foot step 10 is overloaded.

In addition, the alarm 40 may also be configured as a vibrator, a flash light or a voice prompter. It can be understood that the present disclosure is not limited to these examples. The alarm 40 may be configured as any device capable of providing reminding functions.

In some embodiments, the load detection device 20 includes a weight detection strain gauge, and the weight detection strain gauge is arranged over an entire length of the foot step 10. In other words, the foot step 10 is provided with the weight detection strain gauge for detecting the load applied to the foot step 10. The weight detection strain gauge extends along a length direction of the foot step 10, and a length of the weight detection strain gauge is approximately the same with the length of the foot step 10.

It can be understood that, the load detection device 20 is not limited to the form of the strain gauge. For example, in other embodiments, the load detection device 20 includes a plurality of weight sensors arranged at intervals along the length direction of the foot step 10. In the descriptions of the present disclosure, "a plurality of" means at least two, such as two, three and so on, unless specified otherwise.

In some embodiments, the foot step 10 includes a base body 11 and a cover plate 12. The base body 11 has a cavity 111, and the base body 11 is provided with an opening 112 leading to or connected with the cavity 111. The cover plate 12 can be arranged to cover the opening 112. For example, in some implementations, the cover plate 12 is mounted to the base body 11 by being fitted in the opening 112. The load detection device 20 is located in the cavity 111 and under the cover plate 12. In other words, the load detection device 20 is arranged in the cavity 111 and may be connected with a lower surface of the cover plate 12.

Figure 2:
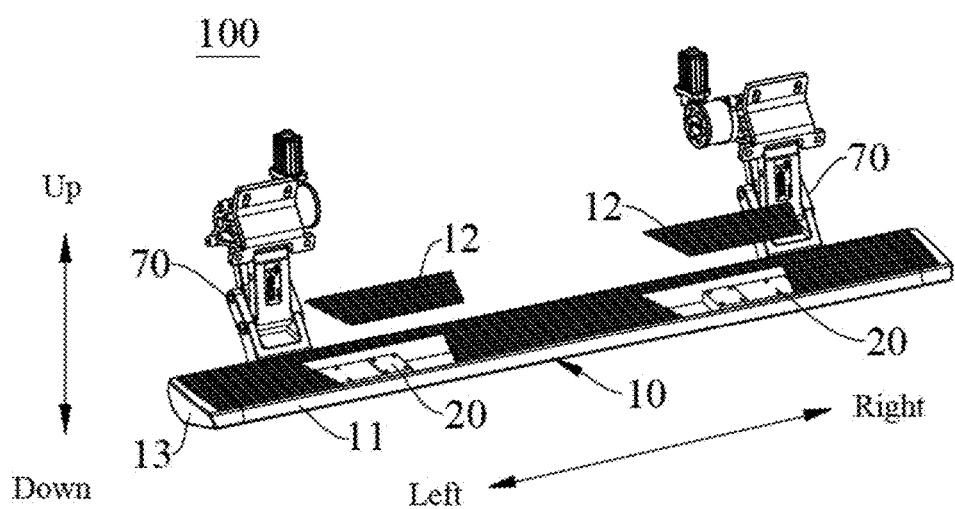
FIG. 2 is an exploded view of a step apparatus for a vehicle according to an embodiment of the present disclosure from an angle.
Figure 3:
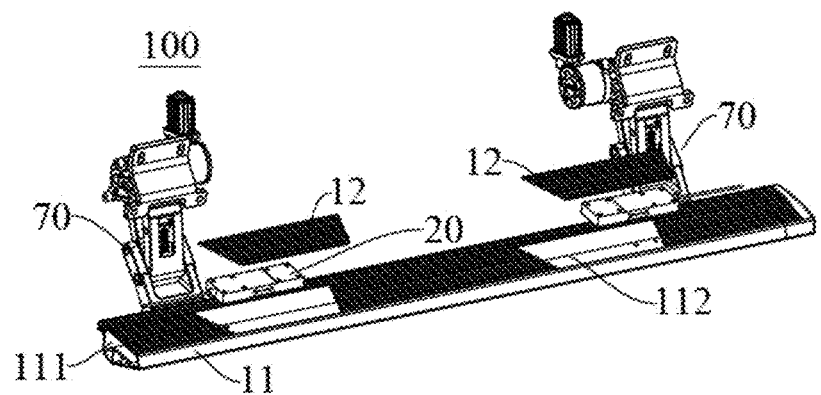
FIG. 3 is an exploded view of a step apparatus for a vehicle according to an embodiment of the present disclosure from another angle.
Figure 4:
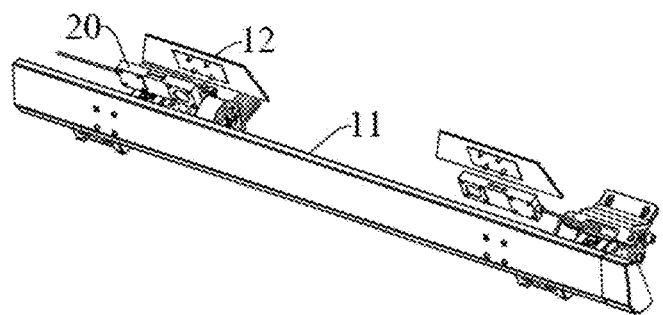
FIG. 4 is an exploded view of a step apparatus for a vehicle according to an embodiment of the present disclosure from still another angle.

As illustrated in FIGS. 2-4, the length direction of the cover plate 12 is the same with the length direction of the base body 11. The length of the cover plate 12 is less than the length of the base body 11. An upper surface of the cover plate 12 is roughly flush with an upper surface of the base body 11.

In some embodiments, the cover plate 12 is detachably mounted to the base body 11.

In some examples, a plurality of the openings 112 are provided and arranged at intervals along the length direction of the base body 11. In some embodiments, for example, a plurality of the cover plates 12 are provided and arranged to the plurality of the openings 12 in one-to-one correspondence. A plurality of the load detection devices 20 are provided and arranged in one-to-one correspondence with the plurality of the cover plates 12.

As illustrated in FIGS. 2-4, the base body 11 extends in a left-right direction, and the plurality of the openings 112 are arranged at even intervals in the left-right direction. Each opening 112 is provided with one cover plate 12, and one load detection device 20 is provided under each cover plate 12.

In some embodiments, the cavity 111 runs through the base body 11 along the length direction of the base body 11, the foot step 10 further includes an end cover 13, and the end cover 13 is provided at each of both ends of the base body 11 to enclose the both ends of the cavity 111.

As illustrated in FIGS. 2-4, the cavity 111 extends in the left-right direction, and the length of the cavity 111 is the same with the length of the base body 11. One end cover 13 is arranged at a left end of the base body 11 to enclose a left end of the cavity 111, and one end cover 13 is arranged at a right end of the base body 11 to enclose a right end of the cavity 111.

In some embodiments, the step apparatus 100 further includes at least one retractable device 70. The foot step 10 is mounted to the retractable device 70, and the retractable device 70 is used for driving the foot step 10 to move between an extended position and a retracted position. When a plurality of the retractable devices 70 are provided, for example, the plurality of the retractable devices 70 are arranged at intervals along the length direction of the foot step 10. It can be understood that, when the vehicle door 300 is open, the retractable device 70 drives the foot step 10 to move to the extended position, and people can get on and off the vehicle by the foot step 10, thus improving the convenience. When the vehicle door 300 is closed, the retractable device 70 drives the foot step 10 to move to the retracted position, and the foot step 10 is arranged at the bottom surface of the vehicle body 200, so as not to affect an appearance and a trafficability of the vehicle. In addition, the foot step 10 is fixed in the retracted position to provide a protection function for a side surface of the vehicle.

In some embodiments, the retractable device 70 includes an arm assembly, one end of the arm assembly is pivotally connected to the foot step 10 and the other end of the arm assembly is pivotally connected to the bottom surface of the vehicle body 200. The arm assembly is configured to drive the foot step 10 to move between the extended position and the retracted position under the drive of a driving device, such as an electric motor.

The arm assembly and the foot step 10 may be directly connected or indirectly connected by means of a step support, such as a bracket (e.g., step bracket). The arm assembly and the bottom surface of the vehicle body 200 may be directly connected or indirectly connected by means of a mounting support, such as a bracket (e.g., mounting bracket).

A step apparatus for a vehicle according to another example embodiment of the present disclosure will be described as follows with reference to FIGS. 1-5.

The step apparatus for the vehicle according to some example embodiments of the present disclosure includes a foot step 10, a load detection device 20, a controller 30, an alarm 40, a wireless transmission device, a cloud server 50, a mobile terminal 60 and a plurality of retractable devices 70.

The foot step 10 includes a base body 11, a cover plate 12 and an end cover 13. The base body 11 extends in a left-right direction and has a cavity 111 running through the base body 11 in the left-right direction. A plurality of openings 112 in communication with the cavity 111 are formed in an upper surface of base body 11, and the plurality of openings 112 are arranged at intervals along the left-right direction.

A plurality of the cover plates 12 are provided, and the plurality of the cover plates 12 are arranged to the plurality of openings 112, respectively, and are detachably connected with the base body 11. In other words, each opening 112 is provided with one cover plate 12. Each of a left end and a right end of the base body 11 is provided with the end cover 13. The end cover 13 at the left end of the base body 11 encloses a left end of the cavity 111, and the end cover 13 at the right end of the base body 11 encloses a right end of the cavity 111.

The plurality of retractable devices 70 are arranged at intervals along the left-right direction. Each retractable device 70 includes an arm assembly. One end of the arm assembly is pivotally connected with the base body 11, and the other end of the arm assembly is pivotally connected with a bottom surface of the vehicle body 200. The arm assembly is configured to drive the foot step 10 to move between the extended position and the retracted position under the drive of a driving device such as an electric motor.

In some of the embodiments, the load detection device 20 is a weight sensor, and a plurality of the weight sensors are provided. The plurality of the weight sensors are located in the cavity 111 and are correspondingly arranged under the cover plates 12, respectively. In some implementations, a lower surface of each cover plated 12 is connected with one weight sensor. The weight sensor can detect a load applied to the foot step 10.

The wireless transmission device may wirelessly transmit a load signal of the load detection device 20 to the controller 30. The controller 30 receives and processes the load signal detected by the load detection device 20 and determines whether the foot step 10 is overloaded, and generates an alerting signal when the foot step 10 is overloaded.

The wireless transmission device may transmit the alerting signal sent by the controller 30 to the alarm 40, and the alarm 40 may receive the alerting signal and send out an alert, so as to remind a user when the foot step 10 is overloaded. In some embodiments, the alarm 40 may be a vibrator, a flash or a voice prompter.

In some embodiments, the step apparatus includes the cloud server 50, and the cloud server 50 is connected with the controller 30. The cloud server 50 may receive and store a load signal and an alerting signal transmitted by the controller 30. In some embodiments, the cloud server 50 may record load information applied to the foot step 10 and/or alert information sent by the alarm 40 when the foot step 10 is overloaded. The cloud server 50 may also periodically generate a change report of the load applied to the foot step 10 and a usage alert report.

In some embodiments, the step apparatus includes the mobile terminal 60, and the mobile terminal 60 is a mobile phone of the user and connected with the cloud server 50 to receive the load signal and the alerting signal from the cloud server 50. In some implementations, the cloud server 50 may send the recorded load information applied to the foot step 10 and the recorded alert information sent by the alarm 40 when the step 10 is overloaded, as well as the periodically generated change report of the load applied to the foot step 10 and the periodically generated usage alert report, to the mobile phone of the user. Thus, the user may intuitively check the above information and reports through the mobile phone.

A step apparatus for a vehicle according to another example embodiment of the present disclosure will be described as follows.

As illustrated in FIGS. 2-5, the step apparatus 100 according to some example embodiments of the present disclosure includes a foot step 10 and a load detection device 20. The load detection device 20 is arranged to the foot step 10 and configured to detect a load applied to the foot step 10. In other words, a change of the load applied to the foot step 10 may be detected by the load detection device 20.

In the step apparatus 100 according to some example embodiments of the present disclosure, by means of the load detection device 20 arranged to the foot step 10, the load applied is the foot step 10 is detected, so as to detect the change of the load applied to the foot step 10.

A step apparatus for a vehicle according to another example embodiment of the present disclosure will described as follows.

As illustrated in FIGS. 2-4 and 6, the step apparatus 100 for a vehicle according to an example embodiment of the present disclosure includes a foot step 10, a load detection device 20 and a cloud server 50. The load detection device 20 is coupled to the foot step 10 and configured to detect a load applied to the foot step 10. In other words, a change of the load applied to the foot step 10 may be detected by the load detection device 20.

The cloud server 50 receives and processes a load signal detected by the load detection device 20 to periodically generate a load change report of the foot step 10 and an overloaded usage report of the foot step 10. In some implementations, the cloud server 50 may record load information applied to the foot step 10 and periodically generate the load change report of the foot step 10. The cloud server 50 may also process and analyze the load information applied to the foot step 10 to determine (e.g., judge) whether the foot step 10 is overloaded and periodically generate the overloaded usage report of the foot step.

In the step apparatus 100 according to the embodiment of the present disclosure, the load applied to the foot step 10 is detected by the load detection device 20 arranged with respect to the foot step 10, and the load signal is received and processed by the cloud server 50 to record the load applied to the foot step 10 and to periodically provide the load change report and/or the overloaded usage report of the foot step 10 for a user.

In some embodiments, the step apparatus 100 further includes a mobile terminal 60, in which the mobile terminal 60 is connected to the cloud server 50 for receiving the load change report and the overloaded usage report.

In other words, the cloud server 50 may send the periodically generated load change report and/or overloaded usage report of foot step 10 to the mobile terminal 60, such that the user can intuitively check the load change report and the overloaded usage report of the foot step 10 by means of the mobile terminal 60.

It can be understood that, the cloud server 50 may also directly transmit the load signal on the foot step 10 to the mobile terminal 60, such that the user can intuitively check the load on the foot step 10 through the mobile terminal 60 in real time.

In some embodiments, the mobile terminal 60 may be a mobile phone. The user can intuitively check the information such as the load on the foot step 10, whether the foot step 10 is overloaded, the load change report and the overloaded usage report through the mobile phone.

In some embodiments, the step apparatus 100 for the vehicle further includes at least one retractable device 70, and the retractable device 70 is connected to the foot step 10 so as to drive the foot step 10 to move between an extended position and a retracted position. When a plurality of the retractable devices 70 are provided, the plurality of the retractable devices 70 are arranged at intervals along a length direction of the foot step 10.

In some embodiments, the retractable device 70 includes an arm assembly. One end of the arm assembly is pivotally connected to the foot step 10 and the other end of the arm assembly is pivotally connected to a bottom surface of a vehicle body 200. The arm assembly is configured to drive the foot step 10 to move between the extended position and the retracted position under the drive of a driving device such as an electric motor.

The arm assembly and the foot step 10 may be directly connected or indirectly connected by means of a step support. The arm assembly and the bottom surface of the vehicle body 200 may be directly connected or indirectly connected by means of a mounting support.

Reference throughout this specification to terms "an embodiment," "some embodiments," "an example," "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Moreover, the particular features, structures, materials, or characteristics described may be combined in any suitable manner in one or more embodiments or examples. Furthermore, in the case of non-contradiction, those skilled in the art may combine and group the different embodiments or examples described in this specification and the features of the different embodiments or examples.

In the present disclosure, unless specified or limited otherwise, a first feature is "on" or "under" a second feature may be that the first feature is in direct contact with the second feature, or may be that the first feature and the second feature are contacted through an intermediate medium. Furthermore, a first feature "up," "above," or "on top of" a second feature may be that the first feature is right or obliquely above the second feature, or merely be that the first feature has a level higher than the second feature. The first feature "down", "below" and "under" the second feature may be that the first feature is directly below or obliquely below the second feature, or merely be that the first feature has a level less than the second feature.

In the present disclosure, unless specified or limited otherwise, the terms "mounted," "connected," "coupled", "fixed" or the like should be construed broadly, The terms may indicate, for example, fixed connections, detachable connections, or integral connections, may also indicate mechanical or electrical connections or mutual communication, may also indicate direct connections or indirect connections via intermediate mediums, and may also indicate inner communications of two elements or the interaction between two elements, unless specified or limited otherwise. The specific meanings of the above terms in embodiments of the present disclosure may be understood by those skilled in the art according to particular circumstances.

Although embodiments of the present disclosure have been illustrated and described above, it should be understood that the above embodiments are illustrative and cannot be construed to limit the present disclosure, and that those skilled in the art may change, modify, alternate and vary the above embodiments within the scope of the present disclosure.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A step apparatus for a vehicle, comprising:
    a foot step, wherein the foot step comprises a base body and a cover plate, the base body having a cavity and an opening in communication with the cavity, the cover plate arranged with respect to the opening to cover the opening;
    a load detection device, comprising at least one of a weight detection strain gauge or a plurality of weight sensors, and coupled to the foot step to detect a load applied to the foot step, wherein the load detection device is disposed in the cavity and under the cover plate;
    a controller in communication with the load detection device and configured to receive and process a load signal detected by the load detection device and to determine whether the foot step is overloaded; and
    an alarm in communication with the controller, the controller configured to generate an alerting signal to control the alarm to send out an alert when the controller has determined the foot step is overloaded.

2. The step apparatus for the vehicle according to claim 1, further comprising a wireless transmission device configured to wirelessly transmit the load signal between the load detection device and the controller, wirelessly transmit the alerting signal between the controller and the alarm, or wirelessly transmit both the load signal between the load detection device and the controller and the alerting between the controller and the alarm.

3. The step apparatus for the vehicle according to claim 1, further comprising a cloud server configured to receive and store at least one of the load signal or the alerting signal.

4. The step apparatus for the vehicle according to claim 3, further comprising a mobile terminal connected to the cloud server, the mobile terminal configured to receive the at least one of the load signal or the alerting signal from the cloud server.

5. The step apparatus for the vehicle according to claim 4, wherein the mobile terminal is further configured as the alarm.

6. The step apparatus for the vehicle according to claim 1, wherein the alarm is configured as a vibrator, a flash light, or a voice prompter.

7. The step apparatus for the vehicle according to claim 1, wherein the weight detection strain gauge is arranged over an entire length of the foot step.

8. The step apparatus for the vehicle according to claim 1, wherein the plurality of weight sensors are arranged at intervals along a length direction of the foot step.

9. The step apparatus for the vehicle according to claim 1, wherein the base body includes a plurality of openings that are provided and arranged at intervals along a length direction of the base body, wherein the foot step comprises a plurality of cover plates that are provided and arranged to the plurality of openings in one-to-one correspondence, and wherein the apparatus comprises a plurality of load detection devices that are provided and arranged in one-to-one correspondence with the plurality of cover plates.

10. The step apparatus for the vehicle according to claim 1, wherein the cavity runs through the base body along the length direction of the base body, and wherein the foot step further comprises end covers arranged at both ends a first end and a second end of the base body to enclose the both ends a corresponding first end and a corresponding second end of the cavity, respectively.

11. The step apparatus for the vehicle according to claim 1, further comprising at least one retractable device, wherein the foot step is mounted to the retractable device, and the retractable device is configured to drive the foot step to move between an extended position and a retracted position.

12. A step apparatus for a vehicle, comprising:
a foot step, wherein the foot step comprises a base body and a cover plate, the base body having a cavity and an opening in communication with the cavity, the cover plate arranged with respect to the opening to cover the opening;
a load detection device, comprising at least one of a weight detection strain gauge or a plurality of weight sensors, and coupled to the foot step to detect a load applied to the foot step, wherein the load detection device is disposed in the cavity and under the cover plate; and
a cloud server configured to receive and process a load signal detected by the load detection device to periodically generate a load change report of the foot step and an overloaded usage report of the foot step.

13. The step apparatus for the vehicle according to claim 12, further comprising a mobile terminal connected to the cloud server, the mobile terminal configured to receive the load change report and the overloaded usage report.

14. The step apparatus for the vehicle according to claim 12, further comprising at least one retractable device, wherein the retractable device is connected to the foot step to drive the foot step to move between an extended position and a retracted position.

15. A vehicle, comprising:
a vehicle body; and
a step apparatus, comprising: a foot step, wherein the foot step comprises a base body and a cover plate, the base body having a cavity and an opening in communication with the cavity, the cover plate arranged with respect to the opening to cover the opening;
a load detection device, comprising at least one of a weight detection strain gauge or a plurality of weight sensors, and coupled to the foot step to detect a load applied to the foot step, wherein the load detection device is disposed in the cavity and under the cover plate;
a controller in communication with the load detection device and configured to receive and process a load signal detected by the load detection device and to determine whether the foot step is overloaded; and
an alarm in communication with the controller, the controller configured to generate an alerting signal to control the alarm to send out an alert when the controller has determined the foot step has overloaded.

16. The vehicle according to claim 15, wherein the step apparatus further comprises a wireless transmission device configured to wirelessly transmit the load signal between the load detection device and the controller, wirelessly transmit the alerting signal between the controller and the alarm, or wirelessly transmit both the load signal between the load detection device and the controller and the alerting between the controller and the alarm.

17. The vehicle according to claim 15, wherein the step apparatus further comprises a cloud server configured to receive and store at least one of the load signal or the alerting signal.

18. The vehicle according to claim 17, wherein the step apparatus further comprises a mobile terminal connected to the cloud server, the mobile terminal configured to receive the at least one of the load signal or the alerting signal from the cloud server.

19. The vehicle according to claim 18, wherein the mobile terminal is further configured as the alarm.

* * * * *